United States Patent
Bathla

[11] Patent Number: 6,129,394
[45] Date of Patent: Oct. 10, 2000

[54] HEAT EXCHANGER AND FLUID CONDUCTING TUBE CONNECTION

[75] Inventor: Pritam S. Bathla, Shelby Township, Mich.

[73] Assignee: Chrysler Corporation, Auburn Hills, Mich.

[21] Appl. No.: 09/199,231

[22] Filed: Nov. 24, 1998

[51] Int. Cl.$^7$ .................................................. F16L 13/14
[52] U.S. Cl. .............................. 285/382; 285/39; 29/520; 165/178
[58] Field of Search ................................. 285/382, 382.1, 285/382.2, 39; 29/520; 165/178

[56] References Cited

U.S. PATENT DOCUMENTS

| | | | |
|---|---|---|---|
| 3,467,414 | 9/1969 | Downing | 285/382.2 |
| 4,114,930 | 9/1978 | Perkins et al. | 285/382 |
| 4,723,601 | 2/1988 | Ohara et al. | |
| 5,988,270 | 11/1999 | Chevallier | 285/382.2 |

*Primary Examiner*—Dave W. Arola
*Attorney, Agent, or Firm*—Kenneth H. Maclean

[57] ABSTRACT

A heat exchanger has a thin wall with a sleeve fitting operatively connected thereto and an interior bore in the sleeve fitting to receive the end of a tube. The sleeve fitting has an annular shoulder collar formation thereon spaced from the adjacent thin wall which engages an assembled locking ring which is assembled over the sleeve fitting by axial movement along the sleeve fitting. An assembly member applies a force against the locking ring to cause it to slide over the sleeve fitting and radially inwardly constrict the sleeve fitting against the tube thus forming a permanent mechanical seal therebetween while simultaneously, another assembly member supports the sleeve fitting at the shoulder collar to prevent transmission of force from the first assembly member to the thin wall of the heat exchanger.

4 Claims, 2 Drawing Sheets

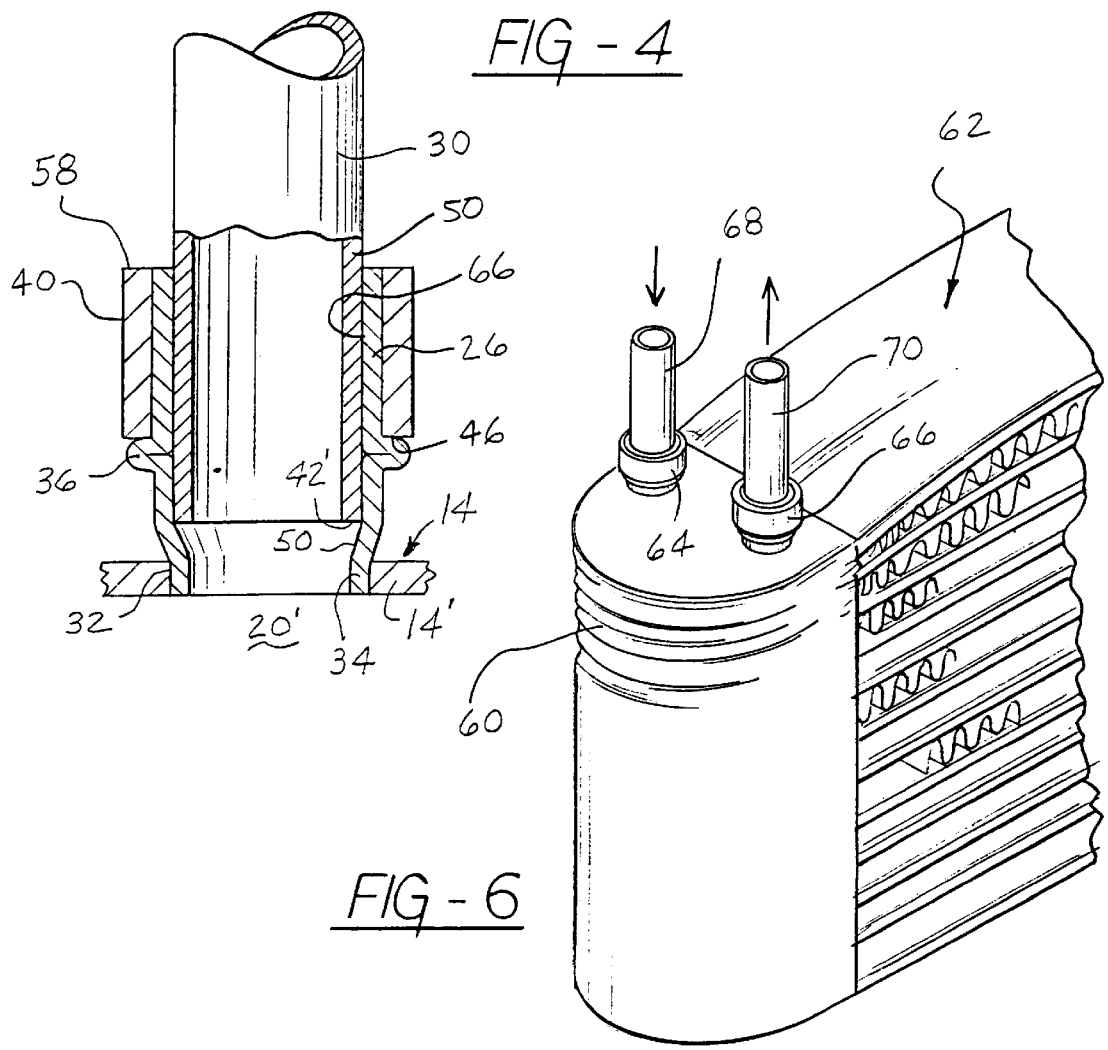
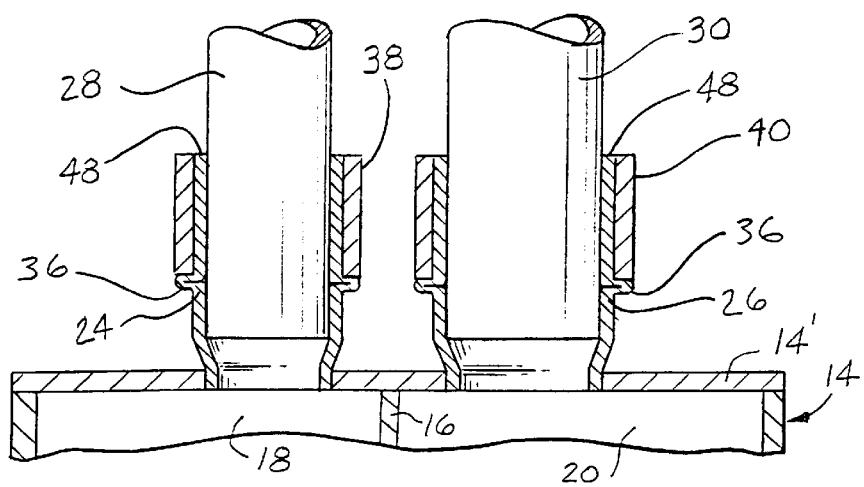

HEAT EXCHANGER AND FLUID CONDUCTING TUBE CONNECTION

BACKGROUND OF THE INVENTION

1. Field of the Invention

The present invention relates generally to heat exchangers and more particularly to an improved fluid tight attachment of a tubular fluid conduit to an inlet/outlet fitting by a mechanical connection.

2. Related Art

Prior to the present invention, various methods have been employed for connecting heat exchangers to inlet and outlet conduits or tubes. These methods include induction brazing, threaded connections, and press fitting. While these prior art methods of connection have proved to be generally satisfactorily, they are difficult to execute and require excessive labor input. Also, these methods are subject to leakage which is difficult to detect and necessitates extensive work in locating and repairing the leakage. U.S. Pat. No. 4,723,601 issued Feb. 9, 1988 to O'Hara et al. for "Multi-Layer Type Heat Exchanger" discloses a heat exchanger with inlet and outlet tubes operatively connected to inlet and outlet tank portions thereof.

SUMMARY OF THE INVENTION

The present invention concerns an improved method of attaching a tube to a heat exchanger fitting by a purely mechanical process which results in an improved attachment between the sleeve and tube in a manner characterized by a high standard of reliability and freedom from leakage. More particularly, the present invention is particularly applicable to plate type heat exchangers having at least one thin wall with an attachment sleeve supported thereon which sleeve is configured with an interior bore to receive an end of a conduit or tube and utilizing an annular locking ring to radially constrict the sleeve inwardly against the tube to effect the connection therebetween created by applying an assembly force to move the locking ring axially down over the sleeve while simultaneously supporting the sleeve to prevent damage to the thin wall of the heat exchanger by the assembly force.

In this invention, the tube attachment utilizes a generally cylindrical locking ring having a predetermined internal diameter sized to slide loosely over the end portion of a fluid conduit or tube which is desired to attach to the attachment sleeve fitting of the heat exchanger. The attachment sleeve has an internal diameter for insertably receiving the tube ending a relatively closely fitting relationship. The attachment sleeve has an annular collar portion which extends circumferentially thereabout and an cylindrical exterior having an outer diameter slightly greater than the internal diameter of the lock ring. As the collar portion is supported against forces that could damage the attached thin wall of the heat exchanger, an attachment assembly force is applied to the locking ring causing it to be moved downward over the larger attachment sleeve causing a substantial radial constriction of the sleeve against the exterior portion of the tube end.

To effect the attachment of tube to sleeve, the assembly force is applied against an end of the locking ring either by a manually operated pliers-like tool or by automatically by machine elements. In either manner, an assembly force is applied to one end of the locking ring tending to move it over the cylindrical end portion of the sleeve toward the collar portion. Simultaneously, an equal and opposite force supports the collar portion of the attachment sleeve. This prevents transmission of any forces to the thin wall of the associated heat exchanger. Resultantly, the lesser diameter surface of the locking ring is forced axially over the larger diameter surface of the attachment sleeve thereby radially contracting the sleeve inward against the tube end to effectively create an annular mechanical connection between the attachment sleeve and the end portion thus permanently joining the members together with a fluid tight seal. Further, the effectiveness of the attachment is readily detected by the installer by both feel and sight.

A feature and object and advantage of the present invention is to provide an improved attachment sleeve to tube connection by a locking ring which ensures a permanent and annular fluid tight seal therebetween without imparting damaging forces to the associated heat exchanger.

It is another feature and object of this invention to provide an improved method or process for permanently attaching a tube to a heat exchanger which has a thin wall supporting an attachment sleeve, comprising the steps of: sliding a locking ring onto an end of a tube; inserting the tube end into an attachment sleeve of the heat exchanger; axially displacing the locking ring along the tube to a position adjacent to the upper end of the attachment sleeve; and applying an assembly force on the locking ring to cause axial movement thereof over the attachment sleeve to thereby radially constrict the sleeve against the tube end while simultaneously supporting the attachment sleeve by a member which prevents transmission of the assembly force to the thin wall of the heat exchanger, thereby preventing damage and distortion of the thin wall.

These and other feature objects and advantages will become more apparent from the following drawing and detailed description.

BRIEF DESCRIPTION OF THE DRAWINGS

FIG. 4 is a view similar to FIGS. 2 and 3 showing the locked ring assembled around the attachment sleeve fitting to create a fluid tight mechanical seal between the attachment sleeve fitting of the heat changer and the tube end, and FIG. 5 is a partially sectioned end elevational view of the heat exchanger and attachment sleeve fittings after connection with inlet and outlet tubes, and FIG. 6 is a perspective view similar to FIG. 1 of distortion and damage to thin walls of the heat exchanger's tank portion and fin structure by application of an assembly force to make the connection between the attachment sleeve fitting and the tube end but without supporting the attachment sleeve.

DETAILED DESCRIPTION OF A PREFERRED EMBODIMENT

Figure 1:
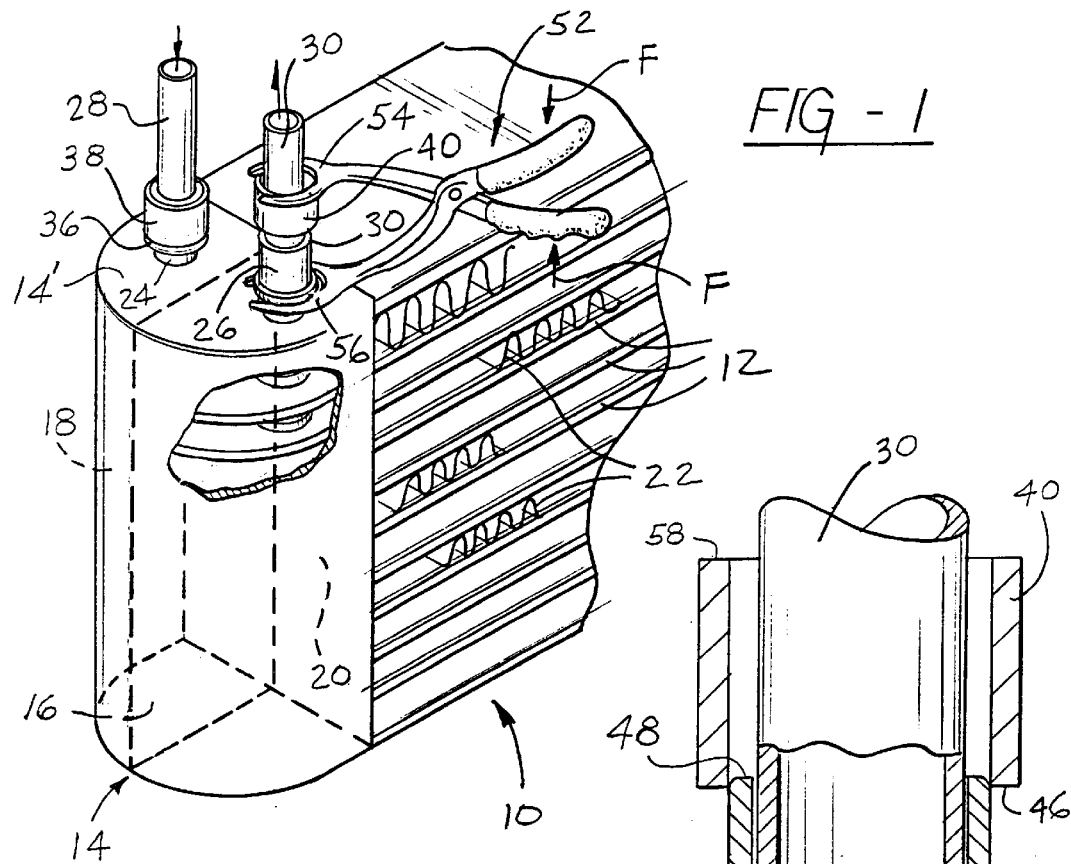
FIG. 1 is a perspective view of a tank portion at one end of a heat exchanger with associated fluid inlet and outlet sleeve fittings and tubes with a manually operated installation tool for effecting attachment between one of the heat exchanger fittings and one of the tubes.

FIG. 1 shows a plate and fin type heat exchanger 10. This type of heat exchanger is typically used as an evaporator of a vehicle air conditioning system and is identified as an example and not to limit the scope of the invention. Evaporator 10 comprises a plurality of laterally spaced, flattened tubes 12, each made from a pair of thin aluminum plates brazed or otherwise joined at their edges so that fluid passages are formed therebetween. Specifically, the tubes are typically configured to form two side by side passages for opposite flow of refrigerant, one flow in one direction and the other flow in the opposite direction. A divided, dual chamber header portion 14 is formed at one end as seen in FIG. 1. The header portion 14 includes relatively thin exterior walls, including an upper wall 14', and an internal divider wall structure 16 separating the header interior into an inlet tank portion 18 and an outlet tank portion 20. Refrigerant flows from the inlet tank portion 18 through one portion of the aforedescribed tubes 12 to the opposite end of the heat exchanger. Specifically, at the opposite end, another header tank (not shown) directs refrigerant flow 180° and back to the outlet tank portion 20 through the second of the two passages formed in each of the tubes 12. The tubes 12 have relatively wide and substantially flat surfaces for improving heat transfer to air passing over the surfaces. To increase the heat transfer, these flat surfaces are in contact with aluminum heat transfer fins 22 which are positioned between two tubes. This permits air flow between pairs of tubes from one face of the heat exchanger to the other opposite face.

In addition to the tubes 12, header portion 14 and fins 22, the evaporator 10 has aluminum inlet and outlet attachment sleeve fittings 24 and 26 which extend outward from the upper wall 14' of the header 14 as best shown in FIG. 5. The sleeves 24, 26 are operatively connected to the wall 14', preferably by brazing. As shown in FIGS. 1 and 5, the sleeves 24, 26 are connected to inlet and outlet refrigerant conducting conduits or tubes 28 and 30, respectively. In a typical air conditioning system, the inlet tube 28 would be fluidly connected to the outlet of an air conditioning condenser (not shown) and the outlet tube 30 would be fluidly connected to an inlet of a compressor (not shown) as is well known in the air conditioning art.

Figure 2:
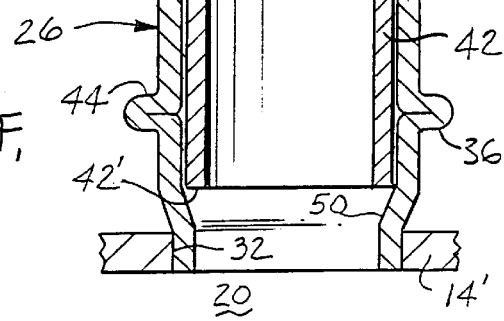
FIG. 2 is an elevational cross-sectioned and enlarged view of a portion of the heat exchanger shown in FIG. 1 showing insertion of a tube into an attachment sleeve fitting of the heat exchanger with a locking ring slideably mounted about the tube.
Figure 3:
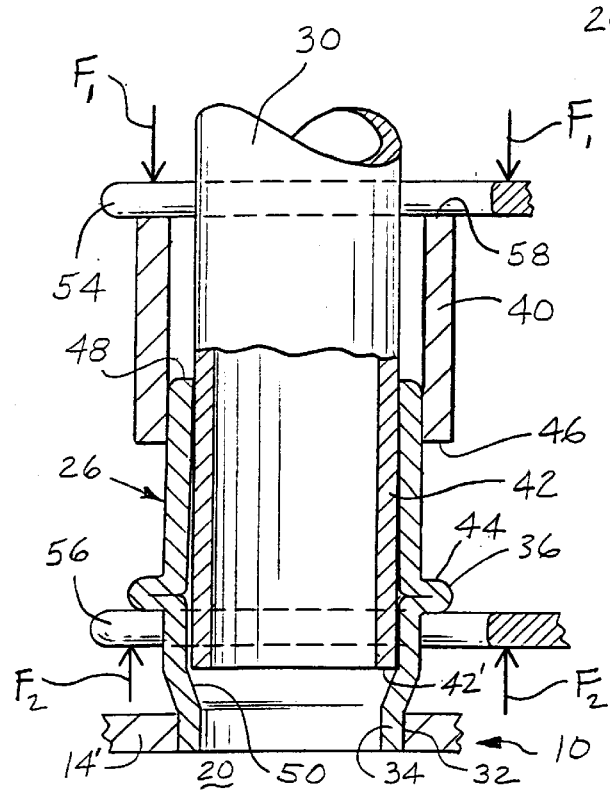
FIG. 3 is a view similar to FIG. 2 showing the initial assembly of the locking ring by axial displacement over and along the attachment sleeve fitting while simultaneously the sleeve is supported in an opposite axial direction.

As shown in FIGS. 2–4, one of the sleeve fittings 26 is illustrated, by example, it being understood that the configuration of the other sleeve fitting 24 is similar. The sleeve fitting 26 is typically secured in a fluid tight manner to the upper wall portion 14' of the associated tank portion 20 by a brazed joint 32. Specifically, each of the sleeves 24, 26 is of aluminum and has a cylindrical and tubular configuration with a reduced end configuration 34 which is inserted in an opening of the header and braze joined to the header. Although only the sleeve 26 is shown in FIGS. 2–4, it should be understood that the foregoing and following description applies equally to the other sleeve fitting 24. The wall of the cylindrical sleeve 26 is formed with an annular support and stop collar or shoulder 36 which is positioned upwardly or outboard of the upper wall 14' of the heat exchanger tank 14. Collars 36 on both sleeves 24, 26 are shown in FIG. 5.

Each collar 36 has an upper surface which act as a stop for an associated locking rings 38 and 40, respectively as seen in FIG. 5. Referring back to FIG. 2, the locking ring 40 is initially positioned loosely about an associated conduit or tube 30. The end portion 42 of conduit 30 is first inserted into the inner diameter of sleeve 26 in a relatively closely spaced relationship as shown in FIG. 2. Then locking ring 40 is moved axially downward toward the collar portion 36 as it is slid or pressed downward over the associated sleeve member 26. The exterior or outside diameter of the attachment sleeve 26 above the collar 36 is slightly larger than the interior or inside diameter of the associated locking ring 40 so that an assembly force is required to press the locking ring 40 downward over the sleeve fitting 26. Collar 36 defines a generally flattened annular upper end surface or shoulder 44 which is adapted to be engaged by a lower end or edge 46 of the locking ring 40 after the locking ring is in its installed position as shown in FIG. 4. As explained more completely herein after, the downward assembly force on the locking ring 40 is opposed by an upward support force on the underside of the collar 36 to prevent transmission of assembly forces to the wall 14' of the header.

The operative steps for connecting the sleeve fitting 26 to the end of the tube 30 are illustrated in FIGS. 2–4. Initially, the end portion 42 of the tube 28 is manually inserted into its associated attachment sleeve fitting 26 until the terminal end 42' engages a reduced diameter portion 50 as seen in FIG. 2. The outer external diameter of the tube's end portion 42 is such that it slideably fits the internal diameter of the sleeve 26 with a slight clearance therebetween sufficient to allow ready insertion. After the end portion 42' is seated in the attachment sleeve fitting 26, the cylindrical locking ring 40 is moved over the upper portion of the sleeve 26 as shown in FIG. 3. As downward movement of the locking ring 40 increases, the resistance increases greatly due to the interference. In this initial position, the lower end 46 of the locking ring 40 seats slightly downward from the annular upper end portion 48 of the sleeve 26. The upper end of sleeve 26 may be configured with a slight taper to ensure that the end of the locking ring 40 initially slips thereabout.

From the initial starting position shown in FIG. 3, further downward movement of the locking ring 40 to the assembled position must be carried out with the aid of an installation tool 52 shown in FIG. 1 or automatically by machine elements. The installation tool 52 has a substantial a pliers-like configuration and includes an upper jaw portion 54 and a lower jaw portion 56. The upper jaw portion 54 partially encircles tube 30 and engages the upper end 58 of the locking ring 40. The lower jaw portion 56 partially encircles sleeve fitting 26 and engages the lower annular surface of collar 36 as shown in FIG. 3. Operation of the assembly tool 52 is best understood by again referring to FIG. 1 which shows a pair of opposing forces F being applied to a pair of handle portions of the installation tool 52. This produces a closure force and motion between the opposite jaw portions 54, 56 of the tool 52. Referring again to FIG. 3, this closure force consists of downward force $F_1$ against the upper end 58 of the locking ring 40 and an equal magnitude supporting force $F_2$ upwards against the underside of collar 36. As a result, the upper jaw portion 54 moves downward as it causes the locking ring 40 to slide axially over attachment sleeve fitting 26 until the lower end 46 of locking ring 40 engages the upper surface of collar 36 as seen in FIG. 4. As indicated earlier, the sizing of the internal diameter of the locking ring 40 slightly less than the external diameter of the attachment sleeve 26 causes the movement of locking ring 40 to the position in FIG. 4 to constricts the attachment sleeve radially inward against the outer diameter of the tube 30 to create an annular fluid tight mechanical fit therebetween. Simultaneously, the lower edge 42' of the tube 30 is seated tightly against the reduced diameter portion 50 of the attachment sleeve fitting 26 illustrated in FIG. 4.

After the locking ring 40 has been pressed into the assembled position shown in Fig. 4 and a fluid tight mechanical fit 66 is achieved between sleeve 40 and tube 30, the closure force F on the installation tool 52 is terminated and the tool removed. The locking ring 40 remains about the sleeve 26 and assures that a fluid tight connection is permanently maintained. In a similar manner the other locking sleeve 38 is installed about the other attachment sleeve 24 and conduit 28 to effect the permanent attachment and sealing between conduit 28 and the inlet portion 18 of the evaporator header 14.

The assembly operation using manual tool 52 is meant to illustrate and describe one procedure for assembling the lock ring on to the sleeve but is not intended to limit the invention to such a manual operation. In fact, it is most likely in volume production and installation of the heat exchanger that the tool 52 and its jaw portions 54, 56 will be replace by an assembly machine including a stationary and rigidly supported member configured like lower jaw 56 which would secure the collar 36 is a desired set axially (and lateral) location. Likewise, a movable member configured like the upper jaw 54 will be used to engage the upper end 58 of the locking ring 40. This movable member would be operatively attached to the assembly machine and to be selectively moved downward to force the locking ring 40 over the attachment sleeve 26. In practice, both locking rings 38 and 40 could be assembled at the same time to there associated attachment fittings 24, 26.

It will be understood to one knowledgeable in the heat exchanger art that the aluminum (or copper) walls of heat exchangers, such as the header wall 14', the tubes 12, and the fins 22, are purposefully and desirably configured with a relatively thin thickness. Obviously, aluminum (and copper) are soft materials. As a result, the heat exchanger walls are susceptible to distortion and damage such as deformations or creases 60 indicated in a plate and fin type evaporator 62 shown in FIG. 6. The evaporator 62 is to similar to the plate and fin evaporator 10 shown in FIG. 1. The damages 60 are easily produced by pressing locking rings onto sleeve fittings by application of a downward force to the locking ring toward the sleeve and header itself without supporting the sleeve at its collar portion. Specifically, damage 60 is readily produced if a force is exerted downward on a locking ring 64 or 66 without also providing an opposing support force to the collar of the sleeve fitting as previously explained and illustrated in FIG. 3. It will also be appreciated that with the construction and installation method of this invention the assembly or installation force loads are applied only between the locking ring and the sleeve collar. As a result, no force is transferred to the thin walls of the evaporator or to a brazed joint between the sleeve fitting and the header wall. Therefore, it can be anticipated that no mechanical damage such as the deformation 60 will be produced.

It also should be appreciated that excellent fluid sealing can be provided by the subject construction with its mechanical seal without any secondary sealing material, adhesives, or coatings. Nevertheless, suitable sealing materials and coating may be used in the sealing interface if so desired without falling outside the scope of the subject invention.

The above described preferred embodiment is illustrative of the invention which may be modified within the scope of the appended claims. The embodiments of the invention in which an exclusive property or privilege is claimed are defined as follows.

I claim:

1. A process for operationally attaching a cylindrical fluid—flow-conducting tube to a heat exchanger having generally cylindrical fluid inflow and outflow sleeves operatively connected to fluid inflow and outflow tank portions thereof comprising the steps of:

a). establishing a positive stop that radially extends from a predetermined position on a first of said sleeves, b). placing an annular constricting and locking ring on said flow conducting tube to be connected to said first of said sleeves;

c) telescoping the end of said flow conducting tube into said first of said sleeves;

d) applying a force to and thereby displacing said constricting and locking ring from a position on said flow conducting tube to a predetermined position around said first of said sleeves as established by physical contact of said constricting and locking ring with said positive stop; and thereby effecting the annular constriction of said first of said sleeves onto the telescoped end of said tube to permanently establish an annular fluid seal between the telescoped end of said tube and said first of said sleeves located radially inward of and in alignment with said locking ring.

2. A process for operationally attaching a cylindrical fluid flow conducting tube to a plate and fin type heat exchanger having generally cylindrical and unitary inflow and outflow attachment sleeves each with an external stop shoulder integrally formed at a predetermined position thereon and each operatively connected to an associated tank portion of the heat exchanger comprising the steps of:

positioning a cylindrical sleeve constricting and locking ring onto said fluid conducting tube so that it is slidably supported thereon;

inserting the end of said fluid conducting tube into a first of said attachment sleeves to define an annular interface therebetween;

displacing said constricting and locking ring to a position on said tube adjacent to and in alignment with the upper end of said first attachment sleeve;

forcing said constricting and locking ring around said first attachment sleeve until said stop shoulder is contacted to annularly constrict said first attachment sleeve so that the inner periphery thereof circumferentially contacts said first tube and effects a permanent annular fluid seal at said annular interface between the end of said tube and said first attachment sleeve.

3. A heat exchanger comprising a body having a one piece and generally cylindrical attachment sleeve operatively connected thereto, said attachment sleeve having an annular stop shoulder extending outwardly from the wall thereof at a point adjacent to the body of the heat exchanger, a constricting and locking ring, a cylindrical flow conducting tube for conducting fluid associated with said heat exchanger, said attachment sleeve having an internal diameter to closely receive the end of said cylindrical flow conducting tube and cooperating therewith to define an annular interface, said attachment sleeve having an external diameter initially slightly greater that the internal diameter of said locking ring initially mounted on the flow conducting tube, said constricting and locking ring being operative when axially forced onto and around said attachment sleeve to a position established by contact of said ring with said annular stop shoulder to annularly and permanently constrict said attachment sleeve to effect a fluid tight seal at the interface between said tube and said first attachment sleeve.

4. A heat exchanger having a one piece cylindrical attachment sleeve operatively connected thereto, said attachment sleeve having an annular external and outwardly extending stop shoulder formed directly on the wall thereof adjacent to the body of the heat exchanger, a cylindrical flow conducting tube associated with said heat exchanger, said attachment sleeve having an internal diameter to closely and slidably receive an end of said cylindrical flow conducting tube, a cylindrical constricting and locking ring loosely supported on said flow conducting tube, said attachment sleeve having an external diameter initially slightly greater than that of the internal diameter of said locking ring as mounted on the flow conducting tube, said attachment sleeve being annularly and permanently constrictable by the forced displacement of said locking ring from said tube and onto said attachment sleeve toward a limit position established by said stop to form a fluid tight and permanent seal at the interface between said tube and said attachment sleeve and radially inward of said locking ring.

* * * * *